3,784,624
PROCESS FOR THE SEPARATION OF DIENE
FROM ORGANIC MIXTURES
Eli Perry, St. Louis, and William F. Strazik, St. Ann, Mo., assignors to Monsanto Company, St. Louis, Mo.
No Drawing. Filed Sept. 22, 1972, Ser. No. 291,458
Int. Cl. C07c 7/00
U.S. Cl. 260—681.5 R
16 Claims

ABSTRACT OF THE DISCLOSURE

Dienes are separated from organic mixtures comprising diene and alkene having one double bond by contacting the mixture against one side of a polymeric permeation membrane, the membrane having a transition metal molecularly dispersed therein and withdrawing on the other side of the membrane a vaporous mixture having increased diene concentration. Exemplary of the organic mixture is a mixture of butadiene and butene. Exemplary of transition metal is silver as elemental silver and as silver tetrafluoroborate.

BACKGROUND OF THE INVENTION

Field of the invention

This invention relates to a process for separating dienes from organic mixtures containing same. In a particular aspect this invention relates to a process for the separation of diene from organic mixtures comprising diene and alkene having one double bond by preferential permeation of the diene through a polymeric membrane under pervaporation conditions. In a more particular aspect this invention relates to a process for the separation of diene from an organic mixture comprising diene and alkene having one double bond by contacting said mixture (feed mixture) against one side of a polymeric permeation membrane, the membrane having a transition metal molecularly dispersed therein and withdrawing at the second side of the membrane a vaporous mixture having a higher concentration of said diene.

Description of the prior art

Processes for the preparation of dienes such as butadiene and isoprene yield reaction mixtures which contain organic reaction products (typically substituted and unsubstituted $C_3$–$C_{12}$ hydrocarbons) in addition to organic solvents and the desired diene. Separation of dienes from such organic reaction media has been accomplished by distillation procedures. Principally because of the close boiling points of dienes and typical reaction by-products, especially the corresponding alkenes having one double bond, high reflux ratios and azeotropic agents and costly distillation equipment are required for the distillation separation procedures.

Separation of components of azeotropic mixtures of organic materials by pervaporation through polymer membranes is known to the art from U.S. Pat. 2,953,502, issued Sept. 20, 1960, to R. C. Binning and Robert J. Lee. Among the membranes indicated as being useful in such separations are membranes of polyethylene, polystyrene, neoprene, polyacrylonitrile, nylon, cellulose, cellulose acetate and polyvinyl alcohol.

SUMMARY OF THE INVENTION

It has been discovered in accordance with the present invention that dienes are effectively separated from organic mixtures comprising diene and alkene having one double bond by contacting the mixture under pervaporation permeation conditions against one side of a polymeric permeation membrane, said membrane having a transition metal molecularly dispersed therein and withdrawing at the second side of the membrane a vaporous mixture having a higher concentration of diene than the aforesaid mixture. Membranes employed in the process of the present invention are highly efficient in separating diene from other components of such organic mixtures using pervaporation separation techniques. The present invention is further advantageous in that it permits avoidance of costly distillation procedures.

DETAILED DESCRIPTION

The process of the present invention comprises contacting an organic feed mixture comprising diene and alkene having one double bond against one side of a polymeric permeation membrane and withdrawing at the second side a mixture having a higher concentration of the preferentially permeable diene than the aforesaid feed mixture. It is essential that the mixture at the second side be maintained at a lower chemical potential than that on the feed side. It is also essential that the product be withdrawn at the second side in the vapor state. In the commercial utilization of the process multi-stage operation is feasible since this permits the operation of the individual stages at various concentrations and temperatures in order to achieve the optimum driving force for the process.

For each individual stage the effectiveness of the separation is shown by the separation factor (S.F.). The separation factor (S.F.) is defined as the ratio of the concentrations of two substances, A and B to be separated, divided into the ratio of the concentrations of the corrresponding substances in the permeate.

$$\text{S.F.} = \frac{(C_A/C_B) \text{ in permeate}}{(C_A/C_B) \text{ in permeant}}$$

where $C_A$ and $C_B$ are the concentration of the prefertentially permeable component and any other component of the mixture or the sum of other components respectively.

In carrying out the process of the present invention the first or feed side of the membrane is such that the activities of the components are greater than the activities on the second side of the membrane. Preferably the first side is above atmospheric pressure and the second side below atmospheric pressure. Still more preferably the second side is maintained such that the pressure differential is greater than 0.01 atmosphere. A further preferred mode of operation is with the second side maintained at a vacuum of greater than 0.2 mm. Hg.

The term "chemical potential" is employed herein as described by Olaf A. Houlgen and K. M. Watson ("Chemical Process Principles, Part 2," John Wiley, New York, 1947). It is related to the escaping tendency of a substance from any particular phase. For an ideal vapor or gas this escaping tendency is equal to the partial pressure so that it varies greatly with changes in the total pressure. For a liquid, change in escaping tendency as a function of total pressure is small. The escaping tendency always depends upon the temperature and concentration. In the present invention the feed substance is typically a liquid solution and the other side of the membrane is maintained such that a vapor phase exists. A vapor feed may be employed when the mixture to be separated is available in that form from an industrial process or when heat economies are to be effected in multi-stage processes.

The feed side may be at pressures less than atmospheric but preferably greater than atmospheric and also at pressures over and above the vapor pressure of the liquid components. The collection or permeate vapor side of the membrane is preferably less than atmospheric pressure but under proper feed side conditions also may be greater than atmospheric pressure. The total pressure on the feed side is preferably between 0 p.s.i. absolute and 5,000 p.s.i.g. The conditions are always such as to maintain a higher chemical potential on the feed side than on the collection or vapor side.

The temperatures on the feed side and the collection side may vary over a wide range. However temperatures should be avoided which cause substantial decomposition of any of the organic materials in the mixture or of the membrane and which cause the vapor pressure on the collection side of any of the permeated materials to be exceeded by the pressure being maintained on that side. Typically an increase in temperature causes an increase in permeation rate. A dramatic increase in rate often occurs when the temperature exceeds the glass transition of the polymer membrane being used in the separation procedure.

The process of the present invention provides for the separation of dienes from organic mixtures containing same. Such dienes can be substituted and unsubstituted and typically contain in the structural backbone from 4 to 8 carbon atoms. The diene may be substituted with, for example, alkyl, aromatic, halogen or other suitable substituents. Typical organic components and mixtures from which the dienes are separated include $C_3$–$C_{12}$ alkenes such as butene, hexene, propylene and heptene as well as other hydrocarbons such as chlorohexane, acrylic acid, octane, propane, etc. and the like. Separations are carried out by removal of the preferentially permeable diene through the membrane with the said diene in a higher concentration than in the feed being recovered from the collection side of the membrane as a vapor and with the imposition of a state of lower chemical potential on such collection side of the membrane. For example a mixture of butadiene and butene may be applied to one side of a flat diaphragm or membrane to accomplish removal of at least a part of the butadiene leaving the more highly concentrated butene solution at the feed side of the membrane or diaphragm. A state of lower chemical potential is maintained on the collection or downstream side of the membrane by vacuum e.g. from 0.1 mm. Hg to the vapor pressure of the organic component of the mixture which has the lowest vapor pressure at the membrane at the respective temperature as long as the vapor phase is present on the downstream side.

In the system referred to above the butadiene selectively passes through the membrane with the butadiene-rich composition being rapidly removed as a vapor from the collection side of the membrane.

In contrast to the present invention the employment of permeates in liquid phase on the second side of the membrane is impractical because the applied pressure has been found to be prohibitively high e.g. up to 1,000 atmospheres being necessary because of osmotic pressures. Liquid-liquid permeation is largely an equilibrium phenomenon unless the osmotic forces are overcome while in contrast liquid-vapor or vapor-vapor permeations are rate controlled processes even at moderate conditions in which the vapor is removed as soon as it reaches the collection surface of the membrane. Liquid-vapor and vapor-vapor separations are accordingly much more effectively carried out than liquid-liquid separations.

The permeation membrane employed in the process of the present invention is a polymeric permeation membrane having a transition metal molecularly dispersed therein. The term "transition metal" as used herein is meant to include elemental metal and combined metal. The membrane may be a simple disc or sheet of a membrane substance which is suitably mounted in a duct or pipe or mounted in a plate and frame filter press. Other forms of the membrane may also be employed such as hollow tubes and fibers through which or around which a feed is supplied or recirculated with the product being removed at the other side of the hollow tube or hollow fiber as a vapor. Various other shapes or sizes are readily adaptable to commercial installations. The membrane of course must be insoluble in the organic medium to be separated. By "membrane insolubility" it is meant that the membrane material is not substantially solution-swellable or sufficiently weakened by its presence in the solution to impart "rubbery" characteristics which can cause creep and rupture under the conditions of use including high pressures.

The art of membrane usage is well known with substantial literature being available on membrane support, fluid flow and the like. The present invention is practiced with such conventional procedures and apparatus. The membrane must of course be sufficiently thin to permit permeation as desired but sufficiently thick so as to not rupture under pressure conditions employed. Typically suitable membranes have a thickness of from about ½ to 10 mils.

In the process of the present invention any polymeric compositions suitable for use as a permeation membrane can be employed in the formation of the polymeric membrane. The polymers may be linear or crosslinked and may vary over a wide range of molecular weights. The polymeric compositions may be various homopolymers and copolymers including grafts, blocks and polymer blends. Examples of such polymers include polyacrylonitrile, polyvinylalcohol, polyvinylchloride, cellulose, cellulose esters, nylon, polyethylene, polystyrene, neoprene, copolymers of acrylonitrile, blends of polyacrylonitrile and other polymers and copolymers such as methacrylonitrile, vinyl halide and ethylene/acrylic acids. Preferred polymers include polyvinyl chloride, acrylonitrile copolymers, and polymer blends containing polyacrylonitrile. Particularly preferred acrylonitrile-containing polymers include copolymers of acrylonitrile and 2-methyl-5-vinylpyridine, blends of polyacrylonitrile and poly(ethyleneimine), copolymers of acrylonitrile and N,N-dimethylaminoethylmethacrylate, copolymers of acrylonitrile and N-vinylpyrrolidone and copolymers of acrylonitrile, N,N-dimethylaminoethylmethacrylate, and the benzyl salt of dimethylaminoethyl methacrylate. When acrylonitrile-containing polymers are employed to obtain optimum effectiveness the copolymer or polymer blends should contain a sufficient amount of acrylonitrile to substantially maintain the physical and chemical characteristics of that material. Essential amounts of acrylonitrile typically constitute 50% or more of the total polymeric material. In the case of copolymers the percent is mole percent and in the case of blends percent is weight percent.

The metal compound employed in the polymeric permeation membrane used in the present invention is a transition metal (the transition metals of Groups I–B, II–B, III–B, IV–B, V–B, VI–B, VII–B, and VIII–B of the Periodic Table as represented on page 174 of General Chemistry (Sisler, Vanderwerf & Davidson (1949), The McMillan Company). For optimum effectiveness the transition metal must be in a form and in an oxidation state to permit chemical interaction between it and the preferentially permeable diene. Chemical interaction of the preferentially permeable diene and transition metal is readily determined by known methods. Examples of such metal compounds or species which when molecularly dispersed in a polymer permeation membrane are useful in the process of the present invention include

| | |
|---|---|
| $AgNO_3$ | $Rh(I)$ |
| $CuCl_2$ | $Rh(II)$ |
| $HgCl_2$ | $Pd(benzo\ nitrile)_2Cl_2$ |
| $AgBF_4$ | $RhCl_3$ |
| $Ag(O)$ | $AgSbF_6$ |
| $Pt(II)$ | $Pt(PPh_3)_2C_2H_4$ |
| $Pd(II)$ | $PtCl_4$ |
| $Cu(I)$ | $Rh_2(C_2H_4)_4Cl_2$ |

As previously stated, the transition metal can be present in the membrane in a free state or in a combined state for example as a salt and hydroxide or other suitable combined form provided, of course, that the transition metal compound is molecularly dispersed in the polymeric membrane and is in a form and an oxidation state which permits its chemical interaction with the preferentially permeable diene. If desired, more than one transition metal can be incorporated in the membrane. The amount of transition metal which is contained in the polymeric membrane can vary over a wide range with the preferred amount depending among other things, on the particular metal or form of metal and the particular polymeric membrane. Any effective amount of metal can be employed. Amounts in the range of from about 0.1 to about 40% are typically employed with amounts in the range of from about 1 to about 35% being generally preferred. Amounts over about 50% should generally be avoided since such amounts tend to weaken the membrane.

In order to obtain optimum separation results, it is desired that the metal be maintained in the polymeric membrane during permeation. Sufficient chemical interaction of metal compound and polymer to inhibit removal of the metal from the membrane during the process of permeation is, therefore, desired. Effective membranes in which chemical interaction of metal and polymer occurs are composed of polymers which contain coordinating groups which groups form covalent (including coordinate covalent) bonds with the requisite metal compound, the metal thereby being bound at least to some degree to coordinating groups contained in the polymer. Since any Lewis base (or molecule possessing one or more sites which can function as a Lewis base by donation of electrons) can coordinate with a metallic ion or atom acting as a Lewis acid, it will be appreciated that there is a large number and variety of such coordinating groups which are present or which can be incorporated into suitable polymeric permeation membrane compositions. Such coordinating groups in which nitrogen is the donor atom include amine groups (primary, secondary and tertiary) for example polyethyleneimine and poly(vinylpyridine); amide groups for example nylon; nitrile groups for example acrylonitrile and hydrazide groups. Suitable coordinating groups in which oxygen is the donor atom include alcohol groups for example, polyvinylalcohol; carbonyl groups, for example polymethacrylate and ether groups such as polyethylvinylether. Suitable coordinating groups in which sulfur serves as the donor atom include thiourea groups, thioether groups, alkyl sulfide groups, and thiocarbonyl groups. Other groups which are present or can also be incorporated into the polymer are groups which contain carbon atoms or carbon-carbon unsaturated bonds either or both of which act as donor sites for the transition metal incorporated in the membrane, for example metallocene polymers such as polyvinylferrocene and polymers containing carbon-carbon double bonds such as polyisoprene. Chemical interaction can be effected by other suitable means such as by ionic bonding of transition metal to polymers having active ionic groups, suitable anionic moieties or end groups including carboxylate, sulfonic, phosphonate, phosphonic, arsenic and telluric.

Although it is preferred, in order to obtain optimum results and also to minimize loss of metal from the polymeric permeation membrane during permeation, that the transition metal be chemically interacted with polymer, the present invention also encompasses membranes wherein the metal is not chemically interacted with the polymer provided, of course, that the metal is, in all cases, molecularly dispersed in the membrane. However, in all cases interaction of polymer and metal is preferred.

Metal-containing membranes for use in the process of the present invention can be prepared by any suitable procedure with such procedures including casting from a solution or dispersion of the polymer and a soluble form of the metal, such as a salt, and melt pressing an intimate mixture of powdered polymer and metal. Also the polymeric membrane may be first formed for example by casting and then interacted with transition metal for example by soaking the preformed membrane in a solution containing the transition metal.

Often, improved diene permeation can be effected if the metal-containing polymeric membrane is conditioned prior to use. This preconditioning can serve among other things to replace undesirable ligands (e.g. from solvent) from the metal by ligands more easily displaced during permeation. This preconditioning can be done, for example, by soaking the membrane in a solution containing displacing ligands or by casting the polymeric membrane from a solution which contains, in addition to the polymer and the metal species and the solvent, an organic material which comprises an alkene linkage.

The following examples illustrate specific embodiments of the present invention. In the examples the membranes employed were in the form of film disks and were mounted in a membrane holder.

EXAMPLE 1

Membrane permeations were conducted for the purpose of separating 1,3-butadiene from an organic liquid (80 wt. percent 1,3-butadiene and 20 wt. percent trans-2-butene). The separations were carried out under pervaporation conditions at approximately room temperature. Each membrane was approximately 1 mil thick. In each run the the pressure on the liquid side was above atmospheric and the pressure on the vapor side was about 0.1 mm. Hg. Preferential permeation of 1,3-butadiene was effected in each run. The results are shown in Table I.

EXAMPLE 2

The procedure of Example 1 is followed to separate isoprene from a liquid mixture of isoprene, hexene, and pentene using polymeric membranes having a transition metal molecularly dispersed therein.

While the invention has been described with reference to particular embodiments thereof, it would be appreciated that modifications and variations are possible without departing from the invention.

TABLE I

| Run Number | Polymer membrane | Metal | Weight percent metal in membrane [3] | Permeation Rate×10⁴ g./hr./11 cm.²/mil of membrane thickness* | S.F. |
|---|---|---|---|---|---|
| 1 | Poly(vinylchloride) | None | | 1,200 | 2.11 |
| 2 | do | Pd(benzonitrile)₂Cl₂ | 20 | 480 | 3.00 |
| 3 | do | HgCl₂ | 20 | 900 | 2.65 |
| 4 | do | AgBF₄ | 20 | 400 | 3.78 |
| 5 | do | AgSbF₆ | 20 | 3,000 | 3.02 |
| 6 | do | AgPF₆ | 20 | 1,000 | 2.80 |
| 7 | Copolymer[acrylonitrile/2-methyl-5-vinyl pyridine (32 mole percent)] | None | | [1] 10-50 | 2.5-2.8 |
| 8 | do | AgBF₄ | [2] 1:1 | 0.2 | 7.21 |
| 9 | do | AgBF₄ | [2] 2:1 | [1] 5.50 | 5.6-6.7 |
| 10 | do | AgSbF₆ | [2] 2:1 | 10 | 4.8 |
| 11 | do | PtCl₂ | [2] 1:1 | 30 | 4.1 |
| 12 | do | HgCl₂ | [2] 1:1 | 0.6 | 1.11 |
| 13 | Poly(vinylalcohol) | None | | 1.1 | 1.68 |
| 14 | Poly(vinylalcohol) | AgBF₄ | 20 | 0.6 | 1.2 |
| 15 | Copolymer[acrylonitrile/styrene (24 mole percent)] | None | | [1] 10-20 | 4.6 |
| 16 | do | Pd(benzonitrile)₂Cl₂ | 20 | 20 | 3.42 |
| 17 | do | HgCl₂ | 20 | 0.4 | 3.26 |
| 18 | do | PtCl₂ | 20 | 0.8 | 2.40 |
| 19 | do | AgBF₄ | 20 | [1] 0.5-3.0 | 5.0-6.0 |
| 20 | Copolymer[acrylonitrile/styrene (38 mole percent)] | None | | 30 | 4.00 |
| 21 | do | Pd(benzonitrile)₂Cl₂ | 20 | 40 | 3.01 |
| 22 | do | RhCl₃ | 20 | [1] 20-200 | [1] 3.7-4.9 |
| 23 | Cyanoethylated cellulose (0.5=2.18) D.S. | None | | 1.8 | 3.35 |
| 24 | do | Pd(benzonitrile)₂Cl₂ | 20 | 1.3 | 3.97 |
| 25 | 85/15 W./W. blend of poly(acrylonitrile) and poly(ethylenimine) | None | | 0.25 | 1.23 |
| 26 | do | AgBF₄ | 20 | 0.6 | 1.20 |
| 27 | do | (Pd(benzonitrile)₂Cl₂ | 20 | 0.2 | 2.56 |
| 28 | Copolymer[acrylonitrile/N,N-dimethylaminoethylmethacrylate (3 mole percent)] | None | | 0.15 | 1.6 |
| 29 | do | AgBF₄ | 20 | 0.04 | 3.10 |
| 30 | Copolymer[acrylonitrile/n-vinylpyrrolidone (16 mole percent)] | None | | [1] 0.8-1.4 | [1] 6.3-7.0 |
| 31 | do | AgBF₄ | 20 | 1.4 | 7.86 |
| 32 | Cellulose triacetate | None | | 1,300 | 2.54 |
| 33 | do | Pt(PPh₃)₂C₂H₄ | 20 | 14,000 | 1.95 |
| 34 | Copolymer[vinylchloride/ethylene (20 mole percent)] | None | | 2,500 | 2.4 |
| 35 | do | Rh₂(C₂H₄)₄Cl₂ | 10 | 3,500 | 2.1 |
| 36 | Copolymer [vinylchloride/ethylene (20 mole percent)] | Pt(PPh₃)₂C₂H₄ | 20 | 3,300 | 2.2 |
| 37 | Terpolymer[poly(acrylonitrile)/N,N-dimethylaminoethylmethacrylate/benzyl salt of dimethylaminoethyl methacrylate] | None | | 0.1 | 1.24 |
| 38 | do | [PtCl₄] | 20 | 1.0 | 1.52 |

[1] Represents multiple runs.
[2] Molar ratio of 2-methylvinylpyridine to metal compound.
[3] Weight of metal compound.
*Rates above 1,200 may indicate weakness in membrane.

What is claimed is:

1. A process for the separation of diene from an organic mixture comprising diene and alkene having one double bond which comprises contacting the said mixture against one side of a polymeric permeation membrane selected from the group consisting of (1) an acrylonitrile-containing copolymer (2) a polyacrylonitrile-containing polymer blend (3) poly(vinylchloride) and (4) cyanoethyl cellulose, said membrane having molecularly dispersed therein an effective amount up to about 50% by weight based on the weight of the membrane of a transition metal, said transition metal being in a form and in an oxidation state to permit chemical interaction with the said diene and withdrawing at the second side a vaporous mixture having a higher concentration of said diene than the aforesaid organic mixture with the vaporous mixture at the second side being maintained at a lower chemical potential.

2. The process of claim 1 wherein the pressure on the second side of the membrane is less than atmospheric pressure and lower than the pressure on the other side of the membrane.

3. The process of claim 1 wherein the organic mixture is a liquid mixture.

4. The process of claim 1 wherein the metal is interacted with the polymeric membrane.

5. The process of claim 1 wherein the organic mixture comprises butadiene and butene.

6. The process of claim 1 wherein the metal is silver.

7. The process of claim 6 wherein the silver is in the form of silver tetrafluoroborate.

8. The process of claim 1 wherein the polymeric membrane is polyvinylchloride.

9. The process of claim 1 wherein the polymeric membrane is cyanoethyl cellulose.

10. The process of claim 1 wherein the polymeric membrane is an acrylonitrile-containing copolymer.

11. The process of claim 10 wherein the copolymer is acrylonitrile/2-methyl-5-vinylpyridine.

12. The process of claim 10 wherein the copolymer is acrylonitrile/N,N-dimethylaminoethylmethacrylate.

13. The process of claim 10 wherein the copolymer is acrylonitrile/N-vinylpyrrolidone.

14. The process of claim 10 wherein the copolymer is acrylonitrile/N,N - dimethylaminoethylmethacrylate/benzyl salt of dimethylaminoethylmethacrylate.

15. The process of claim 1 wherein the polymeric membrane is a polyacrylonitrile-containing polymer blend.

16. The process of claim 15 wherein the polymer blend is polyacrylonitrile and poly(ethyleneimine).

References Cited

UNITED STATES PATENTS

| 2,913,505 | 11/1959 | Van Raay et al. | 260—677 A |
| 2,923,751 | 2/1960 | Binning et al. | 208—308 |
| 2,947,687 | 8/1960 | Lee | 208—308 |
| 2,960,462 | 11/1960 | Lee et al. | 208—308 |
| 2,985,588 | 5/1961 | Binning et al. | 210—23 |
| 3,101,381 | 8/1963 | Nesmith | 260—677 A |
| 3,370,102 | 2/1968 | Carpenter et al. | 208—308 |
| 3,733,367 | 5/1973 | Perry et al. | 260—669 A |

DELBERT E. GANTZ, Primary Examiner

V. O'KEEFE, Assistant Examiner

U.S. Cl. X.R.

260—677 A